(12) United States Patent
Mandell

(10) Patent No.: US 6,176,579 B1
(45) Date of Patent: Jan. 23, 2001

(54) BIFOCAL CONTACT LENS WITH TORIC TRANSITION

(75) Inventor: Robert B. Mandell, Moraga, CA (US)

(73) Assignee: Softfocal Co., Inc, Moraga, CA (US)

( * ) Notice: Under 35 U.S.C. 154(b), the term of this patent shall be extended for 0 days.

(21) Appl. No.: 09/349,012

(22) Filed: Jul. 7, 1999

(51) Int. Cl.[7] .............................. G02C 7/04; G02C 7/02
(52) U.S. Cl. ............................................ 351/161; 351/177
(58) Field of Search .............................. 351/161, 160 R, 351/160 H, 162, 176, 177

(56) References Cited

U.S. PATENT DOCUMENTS

| | | | |
|---|---|---|---|
| 4,458,454 | 7/1984 | Barnett | 451/42 |
| 4,636,049 | 1/1987 | Blaker | 351/161 |
| 4,752,123 | 6/1988 | Blaker | 351/161 |
| 4,869,587 | 9/1989 | Bregar | 351/161 |
| 4,971,432 | 11/1990 | Koeniger | 351/161 |
| 5,125,729 | 6/1992 | Mercure | 351/161 |
| 5,452,031 | 9/1995 | Ducharme | 351/177 |
| 5,608,471 | 3/1997 | Miller | 351/161 |
| 5,650,838 * | 7/1997 | Roffman et al. | 351/177 |
| 5,715,031 | 2/1998 | Roffman | 351/161 |
| 5,754,270 | 5/1998 | Rehse | 351/161 |
| 5,798,817 | 8/1998 | deCarle | 351/161 |
| 5,847,802 * | 12/1998 | Menezes et al. | 351/161 |
| 5,864,379 | 1/1999 | Dunn | 351/161 |
| 5,877,839 | 3/1999 | Portney | 351/161 |
| 6,030,077 * | 2/2000 | Sawano et al. | 351/161 |

OTHER PUBLICATIONS

Wesley, NK and Jessen, GN: The sphercon bifocal contact lens, Optom. Weekly, 49:583–585, pp. 583–585, Mar., 1958.
deCarle, J: The deCarle bifocal contact lens, Contacto, 3:pp. 5–9, 1959.

* cited by examiner

*Primary Examiner*—Scott J. Sugarman
*Assistant Examiner*—Jordan M. Schwartz

(57) ABSTRACT

Bifocal contact lenses are lenses with two zones having different optical powers, or more than two zones in which case they are also called multifocal lenses. Concentric bifocal contact lenses have two or more annular power zones with a connection that presents optical problems. These optical problems are solved in my invention by connecting the spherical power zones for far and near viewing by a unique toric transition zone. The toric transition zone provides a smooth and continuous slope that will not produce visual jump where it joins with the power zones. There is only one toric curve with the correct properties for each pair of bifocal power zone parameters, consisting of the power zone radii and widths.

15 Claims, 4 Drawing Sheets

BIFOCAL CONTACT LENS WITH TORIC TRANSITION

BACKGROUND OF THE INVENTION

Bifocal contact lenses are lenses with two zones having different optical powers, or more than two zones in which case they are also called multifocal lenses. A far power zone provides the optical power that is needed for the wearer's distance vision and a near power zone, sometimes called a segment, provides the optical power that is needed for the wearer's near vision. The power zones together with an optional transition zone form the bifocal portion of the lens.

In order for a bifocal to function properly on the eye the pupil must be covered at least partly or completely by the far power zone of the lens when the eye observes a distant object and covered at least partly or completely by the near power zone of the lens when the eye observes a near object. This may be accomplished by a shifting action of the contact lens as the eye looks between distance and near. Alternatively, a principle known as simultaneous vision can be used in which the contact lens is designed and fitted in such a way as to position part or all of the far and near power zones in front of the pupil at the same time so that both contribute to the retinal image.

Bifocal contact lenses generally are classified into two types, segmented and concentric. Segmented bifocal contact lenses have two or more vertically separated power zones. Concentric bifocal contact lenses have two or more annular power zones.

There are several subtypes of segmented bifocal contact lenses, with dividing lines of different shapes between the power zones, including round, D shaped, flat, crescent, and others. The near power zone is placed at the lower portion of the lens and maintained in that position by one of various features that can be incorporated into the lens to stabilize the meridional rotation of the lens as much as possible. This is commonly accomplished by adding a "prism" to the lens, which thickens the lower area of the lens and serves to maintain the desired orientation and keep the near power zone of the lens downward relative to the pupil, making it ineffective during distance viewing. For reading or other near-vision tasks, the eye rotates downward and the contact lens shifts upward, placing the near power zone in front of at least part of the pupil and thereby providing an optical correction for near vision. Unfortunately, the shifting action is difficult to control, and may not occur when desired, which causes blurring of the wearer's vision. Shifting is especially difficult for soft contact lenses, compared to rigid contact lenses.

Concentric bifocal contact lenses have an advantage over segmented lenses in that they are usually more comfortable for the wearer and usually do not rely on a shifting action, although some shifting may be desirable. Many designs of concentric bifocal contact lenses exist, all of which have at least two power zones. They differ in terms of whether the power zones are spherical or aspherical and whether the far or near power zone of the lens occurs at the lens center. In addition, they differ in the design of the transition between the power zones.

Each bifocal lens type requires a different fitting procedure. It is generally felt that segmented bifocals are the most difficult to fit and this may contribute to their limited success. Concentric bifocals are easier to fit but have suffered from various optical problems that have limited their success.

Early concentric bifocal contact lenses such as the Bicon bifocal contact lens, described by Wesley and Jessen, and the DeCarle bifocal had two power zones connected directly with a junction but no transition zone. Several other concentric bifocal contact lenses are constructed without a transition zone as described, for example, in U.S. Pat. No. 4,636,049, U.S. Pat. No. 4,752,123 and U.S. Pat. No. 4,869,587. In each of these examples there is an abrupt change in slope at the junction of the far and near power zones of the lens. This change in slope causes a prismatic difference between the far and near power zones of the lens at the junction, which produces unwanted image jump or flare.

Various attempts have been made to smooth the junction between the far and near zones of bifocal contact lenses. One method of smoothing is by polishing, as described in U.S. Pat. No. 4,971,432 and U.S. Pat. No. 4,458,454. However, polishing of the junction is not an exact process and is subject to inconsistent results and reproducibility. The transition zone that is produced has an unknown curvature which cannot be described by a mathematical function and may not avoid prismatic difference between the far and near power zones of the lens.

Other methods to smooth the junction between the far and near zones of bifocal contact lenses involve using transition zones of various curves between the two power zones. Such a transition zone can be made in the form of a spherical curve as described in U.S. Pat. No. 5,864,379, an asphere as described in U.S. Pat. No. 5,864,379, U.S. Pat. No. 5,715,031, U.S. Pat. No. 5,754,270, U.S. Pat. No. 5,877,839, U.S. Pat. No. 5,125,729 and U.S. Pat. No. 5,798,817, a polynomial as described in U.S. Pat. No. 5,452,031, a spline as described in U.S. Pat. No. 5,452,031, or a slope angle as described in U.S. Pat. No. 5,608,471. These transition curves require special curve generating cutting equipment, generally lathes that are capable of multiaxis computer controls of the headstock and tailstock, as known to those familiar with the state of the art.

Some bifocal contact lenses have one or more power zones in the form of an asphere which may be designed to produce a smooth transition between the two power zones such as described in U.S. Pat. No. 5,754,270, which obviates the need for any transition curve. Unfortunately, it is found that when one or both segments of the concentric bifocal contact lens has an aspheric shape then that portion of the lens will not have an optimal optical effect. This occurs because in contact lenses, an aspheric curve will present a multiplicity of powers before the pupil at one time, which produces an imperfect image. Aspheric curves may also induce unwanted aberrations into the lens optics.

Still another method of smoothing the junction between distance and near power zones is to use materials of different indices of refraction for the two power zones. This produces a line-shaped junction which may have a smooth surface but has an abrupt change in prismatic effect when moving from one zone to the other as described in U.S. Pat. No. 3,726,587.

SUMMARY OF THE INVENTION

The optical problems created by previous concentric bifocal contact lenses are solved in my invention by using spherical power zones for far and near viewing that are connected by a unique toric transition zone. The spherical zones for far and near vision provide optimal optical conditions for vision. The unique toric transition zone provides a smooth curve where it joins with the power zones. Light that is refracted by the toric transition zone is brought to a focus at a very close distance so that it does not interfere significantly with the retinal image.

The unique toric transition zone of my invention has certain requirements that must be met in order to fulfill the desired condition of my invention. The two spherical power zones are separated and also connected by a specific toric curve of such radii that the two curves for the power zones have junctions with the transition curve at which there is no change in slope, which produces a perfectly smooth connection between the power zones and the transition zone and avoids optical prism or resulting image jump. In three dimensions this transition zone has the shape of a portion of a unique torus. There is only one toric curve with the correct properties for each pair of bifocal power zone parameters, consisting of the power zone radii and widths.

In the first embodiment of my invention the central power zone is designed for the wearer's distance vision and is also referred to as the far power zone. The outer power zone is designed for the wearer's near vision and is also referred to as the near power zone.

In another embodiment of my invention the central power zone is designed for the wearer's near vision and is also referred to as the near power zone. The outer power zone is designed for the wearer's distance vision and is also referred to as the far power zone.

In still another embodiment of my present invention the central and outer power zones are placed on the back surface of the contact lens.

In still another embodiment of my present invention a prism ballast or other accepted structure is added that is intended to reduce rotation of the contact lens and increase lens movement.

In still another embodiment of my present invention additional far and near zones surround the outer power zone, with an additional transition zone of toric shape between each additional zone.

In still another embodiment of my present invention the contact lens has the appropriate dimensions for an intraocular lens and may be designed for that application.

If the bifocal power zones are placed on the front surface of the contact lens then the back surface of the contact lens is designed in a manner similar to a single vision lens so as to fit the cornea of the individual patient. Generally, the curvature of the back surface of the contact lens is made very similar to the curvature of the cornea. However, there are purposeful differences made in the lens curvatures from the corneal curvatures, which are governed by the shape of the cornea, the shape of the contact lens and the interrelationship that is desired by the fitter in order to control the lens riding position on the cornea and the lens movement.

The example of my invention that follows assumes that the bifocal portion is placed on the front surface of the contact lens, but the same principle can be applied to the back surface. In addition, the same principle may be applied to contact lenses made of any optical material, hard, flexible or soft, that is suitable for a contact lens.

BRIEF DESCRIPTION OF THE DRAWINGS

In the example that follows the bifocal portion is on the front surface of the contact lens, the central power zone is also the far power zone and the outer power zone is also the near power zone.

DETAILED DESCRIPTION OF THE INVENTION

Figure 1:
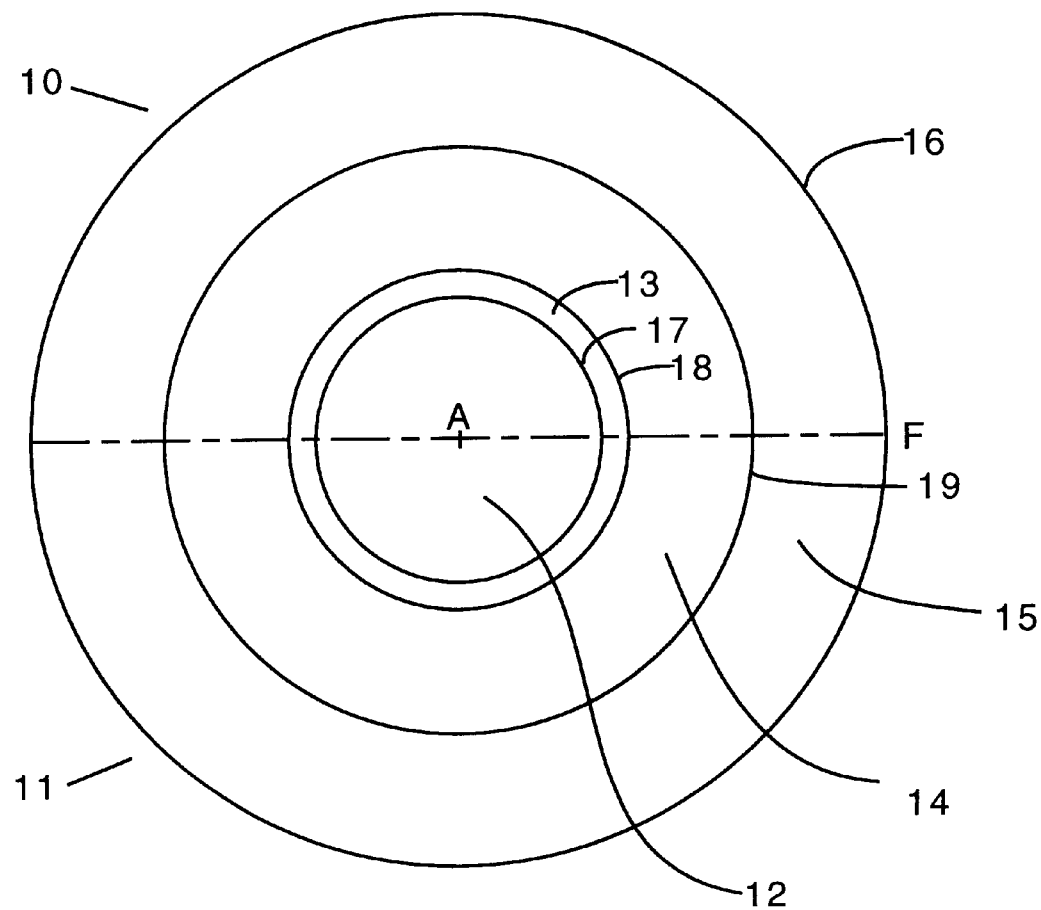
FIG. 1 is a front plan view of the contact lens in accordance with the teachings of my present invention.

One embodiment of my present invention is a bifocal contact lens 10 which has the bifocal portion on the front surface 11 as shown in the plan view of FIG. 1. The front surface 11 of lens 10 is comprised of a central power zone 12 with center point A, surrounded by a concentric transition zone 13, which in turn is surrounded by a concentric outer power zone 14, which in turn is surrounded by a concentric lenticular zone 15, the latter extending to edge 16. The transition zone 13 has an inner junction 17 with central power zone 12 and an outer junction 18 with outer power zone 14. The lenticular zone 15 has an inner junction 19 with the outer power zone 14 and an outer limit at lens edge 16. Point F is a point on lens edge 16.

Figure 2:
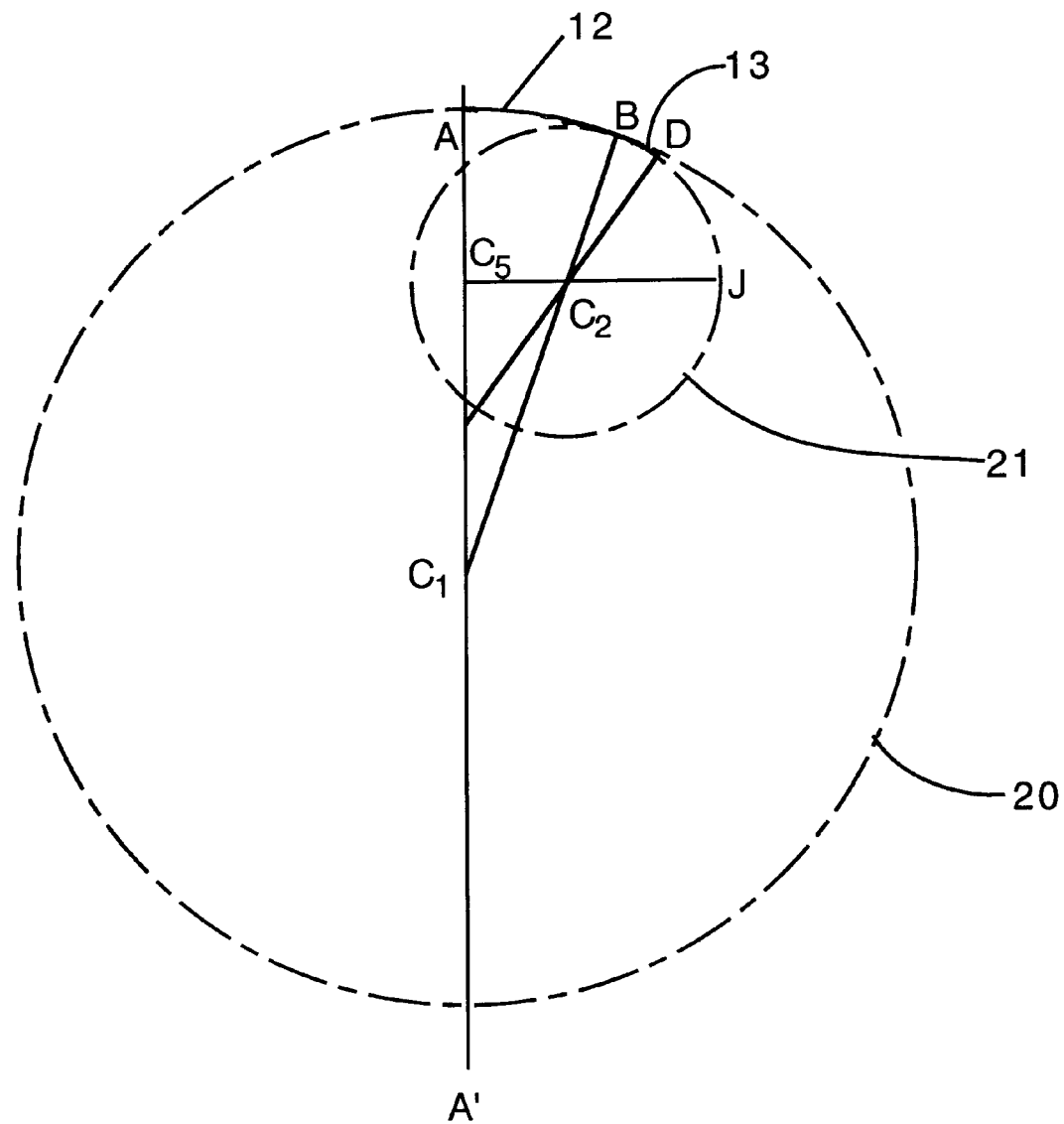
FIG. 2 is a cross-sectional view of the construction of the front surface of the lens as seen along section line A–F of FIG. 1.
Figure 3:
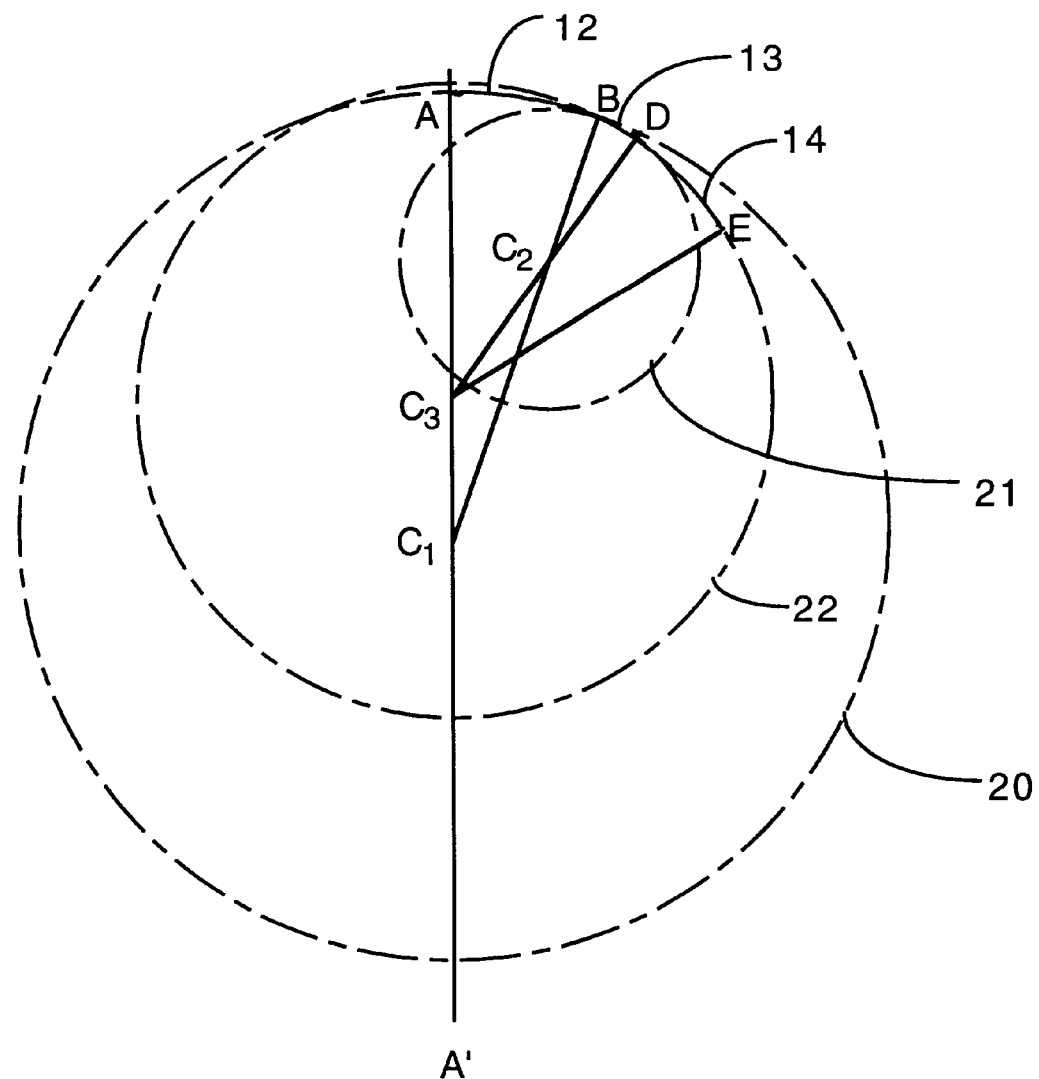
FIG. 3 is another cross-sectional view of the construction of the front surface of the lens of FIG. 1 as seen along section line A–F and showing additional features.

FIG. 2 is a cross section view of the construction of front surface 11 of contact lens 10 in FIG. 1 along the line through center point A and point F on lens edge 16. The construction of the lens surface radii is shown for one half of the lens cross section and if rotated 360 degrees around the axis of symmetry AA' will produce the three-dimensional shape of the lens surface. The central power zone 12 has a spherical shape for distance vision with a center of curvature $C_1$ on axis of symmetry AA' and limited by the arc between center A and point B on junction 17 of the construction circle 20. The distance power zone 12 has a radius of curvature $AC_1$ which is selected to produce an optical power that, in combination with the lens back surface, will provide for the wearer's distance vision. The outer junction point B of distance zone 12 joins distance zone 12 with transition zone 13. Since central power zone 12 has a constant radius of curvature, the radius $BC_1$ is equal to the radius $AC_1$. The transition zone radius $BC_2$ is chosen such that center of curvature $C_2$ of one principal meridian of a toric surface has a radius $BC_2$ that shares part of the radius line $BC_1$, the radius of curvature for the central zone of the lens. The extension of arc BD forms construction circle 21. A radius $C_5J$ for the second principal meridian of the transition zone 13 torus is generated in a plane that is perpendicular to the plane of the paper, with a center of curvature $C_5$ lying on the axis of symmetry AA'. The junction points B and D represent the boundaries of transition zone 13 and have an arc length of approximately 0.3 mm, although lengths of 0.1 to 4.0 mm have been used. In the optical field this arc length is commonly expressed as the separation of lines through B and D and parallel to line AA'.

In FIG, 3 the outer junction point D of transition zone 13 connects transition zone 13 with near power zone 14. At junction point D the center of curvature $C_2$ for transition zone 13 is changed to the center of curvature $C_3$ for the near power zone 14. It is possible to generate a circle in the plane of the paper for any position of the center of curvature $C_3$ but it is only possible to generate a sphere in three dimensions if $C_3$ lies on the axis of symmetry AA'. The radius of transition zone $BC_2$ is unique for the radii of the two power zones in order that the centers of curvature of both the distance and near power zones lie on the axis of symmetry. Arc DE limits the near power zone 14 and an extension of arc DE forms construction circle 22.

Figure 4:
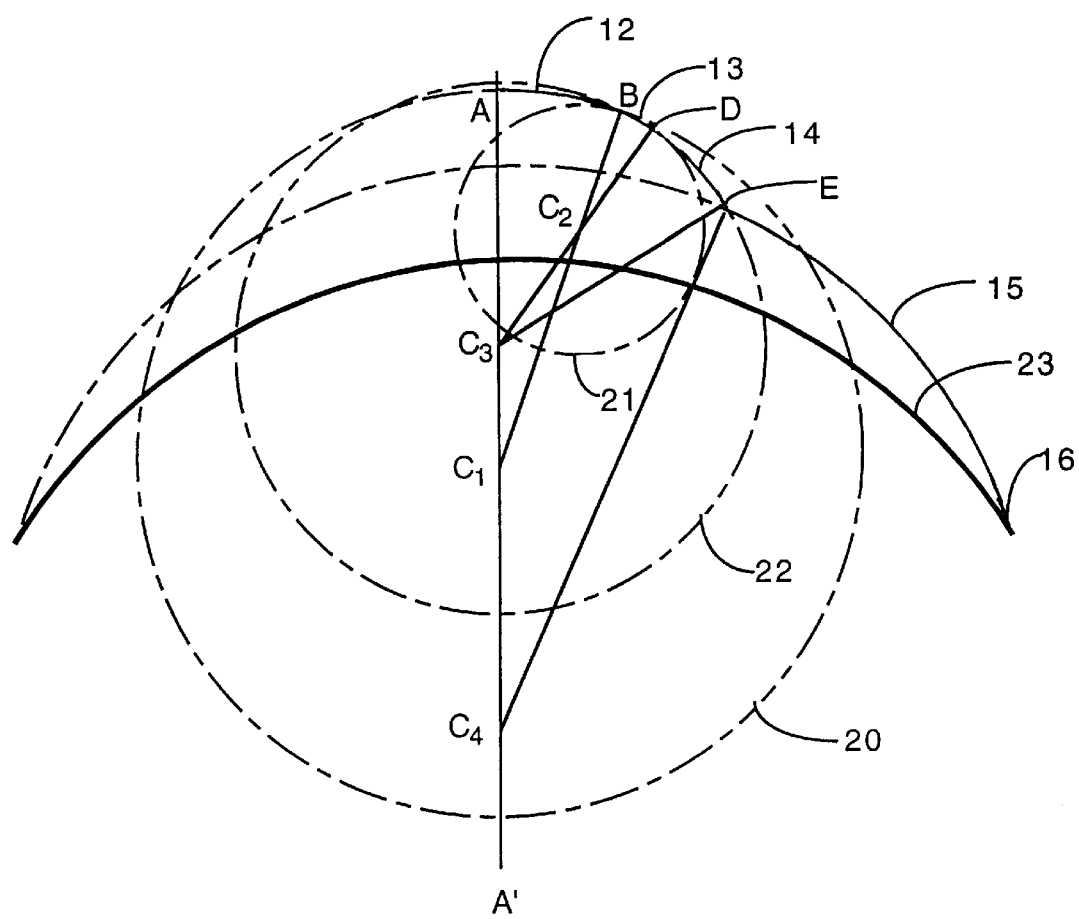
FIG. 4 is cross-sectional view of the construction of the lens of FIG. 1 as seen along section line A–F.

The bifocal portion of the lens may have a diameter that is equal to the total diameter of the lens, in which case edge Q also coincides with point E on the outer junction 19 of near power zone 14. Alternatively, the lens diameter may be greater than the bifocal portion of the lens as shown in FIG. 4, and requires the addition of a lenticular or carrier curve 15. At the outer junction point E of near power zone 14, which also represents the outer limit of the bifocal portion of the lens, a fourth curve of radius $EC_4$ connects the bifocal portion of the lens with edge 16. The lenticular curve 15 is shown as having a center of curvature $C_4$ on the axis of symmetry AA', but $C_4$ may occur either on or off the axis AA'. Point E on junction 19 between near zone 14 and lenticular 15 need not connect a smooth curve because it serves no optical function, but rather is constructed to optimize the geometric shape of the lens together with the back surface 23.

What is claimed is:

1. A bifocal contact lens comprised of a first surface of any construction for the purpose of fitting the lens properly to the eye and a second surface containing a bifocal portion comprised of a spherically-shaped central power zone of one optical power and a spherically-shaped outer power zone of a different optical power with said central power zone and said outer power zone separated and connected by a transition zone of toric shape, said transition zone having a slope at a inner transition zone junction with said central power zone that is equal to the slope of a portion of said central power zone in contact with said inner transition zone junction, and said transition zone having a slope at an outer transition zone junction with said outer power zone that is equal to the slope of a portion of said outer power zone in contact with said outer transition zone junction, whereby in crossing said inner transition zone junction or said outer transition zone junction there is no change in optical prism and thus visual image jump is avoided.

2. The bifocal contact lens of claim 1 wherein the diameter of said bifocal portion is equal to the total diameter of the lens.

3. The bifocal contact lens of claim 1 wherein the diameter of said bifocal portion is less than the total diameter of the lens and surrounded concentrically by one or more lenticular zones.

4. The bifocal contact lens of claim 1 wherein the diameter of said bifocal portion is smaller that the total diameter of the lens and surrounded concentrically by one or more additional power zones.

5. The bifocal contact lens of claim 1 wherein the most central said power zone has more positive or less negative power than the surrounding outer said power zone.

6. The bifocal contact lens of claim 1 wherein the most central said power zone has less positive or more negative power than the surrounding outer said power zone.

7. The bifocal contact lens of claim 1 wherein the dimensions would be suitable for and function as an intraocular lens.

8. The bifocal contact lens of claim 1 wherein prism ballast or other means is added to reduce rotation of the lens.

9. The bifocal contact lens of claim 1 wherein prism ballast or other means is added to enhance movement or shifting of the lens.

10. The bifocal contact lens of claim 1 wherein the bifocal portion of the lens is placed on the back surface and the front surface comprised of any construction for the front surface of a single vision lens.

11. The bifocal contact lens of claim 1, said bifocal contact lens comprising an axis of symmetry, and wherein said outer spherically shaped power zone is surrounded concentrically by a second transition zone of toric shape, said second transition zone having a slope at the junction with said outer power zone that is equal to the slope of a portion of said outer power zone in contact with said second transition zone and further wherein said second transition zone is surrounded by a third spherical power zone with a center of curvature that lies on the axis of symmetry.

12. The bifocal contact lens of claim 1 wherein said outer spherically shaped power zone is surrounded concentrically by a series of one to 6 power zones, each alternating with a transition zone of toric shape, said transition zone having a slope at each junction with said power zones that is equal to the slope of a portion of the adjacent said power zone in contact with said junction so that said transition zone provides a means to avoid optical prism change at said junction.

13. The bifocal contact lens of claim 1 wherein said bifocal contact lens is made of any suitable optical material.

14. A method for manufacturing said bifocal contact lens of claim 1, said bifocal contact lens comprising an axis of symmetry, said method by lathing said central power zone on the front surface using a center of rotation for the cutting tool that is on the axis of symmetry, and lathing said transition zone in the shape of a toric by offsetting the center of rotation of the cutting tool along the radius of said central power zone at said inner transition junction, and lathing said outer power zone using a center of rotation that lies on the axis of symmetry.

15. A method for manufacturing said bifocal contact lens of claim 1 by constructing a mold in the shape of the surface of said bifocal contact lens of claim 1 and then forming a contact lens by a method of molding.

* * * * *